(12) United States Patent
Xu (10) Patent No.: US 12,075,320 B2
(45) Date of Patent: Aug. 27, 2024

(54) METHOD AND APPARATUS FOR PARAMETER CONFIGURATION

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 654 days.

(21) Appl. No.: 17/285,101

(22) PCT Filed: May 8, 2019

(86) PCT No.: PCT/CN2019/085978
§ 371 (c)(1),
(2) Date: Apr. 14, 2021

(87) PCT Pub. No.: WO2020/103403
PCT Pub. Date: May 28, 2020

(65) Prior Publication Data
US 2023/0199453 A1     Jun. 22, 2023

(30) Foreign Application Priority Data

Nov. 19, 2018    (WO) ................ PCT/CN2018/116203

(51) Int. Cl.
*H04L 67/00*      (2022.01)
*H04L 67/60*      (2022.01)
(Continued)

(52) U.S. Cl.
CPC ............... *H04W 4/50* (2018.02); *H04L 67/60* (2022.05); *H04W 8/18* (2013.01)

(58) Field of Classification Search
CPC .......... H04W 4/50; H04W 8/18; H04L 67/60; H04L 67/02; H04L 67/34
See application file for complete search history.

(56) References Cited

U.S. PATENT DOCUMENTS

2018/0084402 A1*   3/2018   Kunz ..................... H04W 8/18

FOREIGN PATENT DOCUMENTS

CN       107438996 A     12/2017
EP        2615775 A1      7/2013
(Continued)

OTHER PUBLICATIONS

Notice of Reasons for Rejection, JP App. No. 2021-526231, Sep. 20, 2020, 8 pages (4 pages of English Translation and 4 pages of Original Document).

(Continued)

*Primary Examiner* — Joseph E Dean, Jr.
(74) *Attorney, Agent, or Firm* — Nicholson De Vos Webster & Elliott LLP (57) ABSTRACT

Methods and apparatuses for parameter configuration. A method implemented at a network device may comprise receiving from a server a parameter provisioning request including one or more communication pattern (CP) parameter sets associated with respective CP parameter set identifiers. The method may further comprise generating a parameter provisioning response including respective result of at least one of the one or more CP parameter sets indicating whether the at least one of the one or more CP parameter sets is provisioned successfully or not. The method may further comprise sending the parameter provisioning response to the server.

20 Claims, 4 Drawing Sheets

(51) Int. Cl.
   *H04W 4/50*   (2018.01)
   *H04W 8/18*   (2009.01)

(56) References Cited

FOREIGN PATENT DOCUMENTS

| | | |
|---|---|---|
| WO | 2017017879 A1 | 2/2017 |
| WO | 2017050701 A1 | 3/2017 |

OTHER PUBLICATIONS

3GPP TS 23.682 V16.0.0, "3rd Generation Partnership Project; Technical Specification Group Services and System Aspects; Architecture enhancements to facilitate communications with packet data networks and applications (Release 16)," Sep. 2018, 126 pages, 3GPP Organizational Partners.
3GPP TS 28.683 V15.0.0, "3rd Generation Partnership Project; Technical Specification Group Services and System Aspects; Telecommunication management; Wireless Local Area Network (WLAN) Network Resource Model (NRM) Integration Reference Point (IRP); Solution Set (SS) definitions (Release 15)," Jun. 2018, 8 pages, 3GPP Organizational Partners.
3GPP TS 29.336 V15.4.0, "3rd Generation Partnership Project; Technical Specification Group Core Network and Terminals; Home Subscriber Server (HSS) diameter interfaces for interworking with packet data networks and applications (Release 15)", Sep. 2018, 73 pages, 3GPP Organizational Partners.
Examination Report, IN App. No. 202147026567, Feb. 25, 2022, 6 pages.
Huawei et al., "Introducing CP parameter to CIR/CIA commands on S6t", 3GPP TSG CT4 Meeting #70bis, C4-152263, rev C4-151798, C4-151919, Oct. 12-16, 2015, 11 pages, Belgrade, Republic of Serbia.
International Preliminary Report on Patentability, PCT App. No. PCT/CN2019/085978, Jun. 3, 2021, 7 pages.
Supplementary European Search Report and Search Opinion, EP App. No. 19887521.3, Dec. 15, 2021, 15 pages.
Office Action, CN App. No. 201980075858.5, Jun. 11, 2023, 14 pages (4 pages of English Translation and 10 pages of Original Document.
Decision of Rejection, JP App. No. 2021-526231, Apr. 11, 2023, 8 pages (4 pages of English Translation and 4 pages of Original Document).
Communication pursuant to Article 94(3) EPC, EP App. No. 19887521.3, Oct. 2, 2023, 13 pages.
Decision to Grant, JP App. No. 2021-526231, Oct. 27, 2023, 5 pages (2 pages of English Translation and 3 pages of Original Document).
Office Action, CO App. No. 20210004381, Nov. 22, 2023, 21 pages (12 pages of English Translation and 9 pages of Original Document).
International Search Report and Written Opinion for Application No. PCT/CN2019/085978, dated Aug. 20, 2019, 10 pages.
3GPP TS 23.682 V15.8.0, "3rd Generation Partnership Project; Technical Specification Group Services and System Aspects; Architecture enhancements to facilitate communications with packet data networks and applications (Release 15)," Mar. 2019, 125 pages, 3GPP Organizational Partners.
3GPP TS 29.122 V15.1.0, "3rd Generation Partnership Project; Technical Specification Group Core Network and Terminals; T8 reference point for Northbound APIs; (Release 15)," Sep. 2018, 273 pages, 3GPP Organizational Partners.
3GPP TS 29.122 V15.3.0, "3rd Generation Partnership Project; Technical Specification Group Core Network and Terminals; T8 reference point for Northbound APIs; (Release 15)," Mar. 2019, 287 pages, 3GPP Organizational Partners.
3GPP TS 29.522 V15.3.0, "3rd Generation Partnership Project; Technical Specification Group Core Network and Terminals; 5G System; Network Exposure Function Northbound APIs; Stage 3 (Release 15)," Mar. 2019, 32 pages, 3GPP Organizational Partners.
3GPP TS 23.502 V16.1.1, "3rd Generation Partnership Project; Technical Specification Group Services and System Aspects; Procedures for the 5G System; Stage 2 (Release 16)," Jun. 2019, 495 pages, 3GPP Organizational Partners.
3GPP TS 29.336 V15.3.0, "3rd Generation Partnership Project; Technical Specification Group Core Network and Terminals; Home Subscriber Server (HSS) diameter interfaces for interworking with packet data networks and applications (Release 15)," Jun. 2018, 71 pages, 3GPP Organizational Partners.
3GPP TS 23.401 V16.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 16)," Jun. 2019, 423 pages, 3GPP Organizational Partners.
Ericsson, "Different results in CP parameter sets provisioning," Nov. 26-30, 2018, 14 pages, 3GPP TSG-CT WG3 Meeting #99, C3-187614, West Palm Beach, Florida.
Ericsson, "Different results in CP parameter sets provisioning," Nov. 26-30, 2018, 14 pages, 3GPP TSG-CT WG3 Meeting #99, C3-187742, West Palm Beach, Florida.
Ericsson, "Different results in CP parameter sets provisioning," Dec. 10-11, 2018, 14 pages, 3GPP TSG-CT Meeting #82, CP-183193, Sorrento, Italy.

* cited by examiner

METHOD AND APPARATUS FOR PARAMETER CONFIGURATION

CROSS-REFERENCE TO RELATED APPLICATIONS

This application is a National stage of International Application No. PCT/CN2019/085978, filed May 8, 2019, which claims priority to International Application No. PCT/CN2018/116203, filed Nov. 19, 2018, which are hereby incorporated by reference.

TECHNICAL FIELD

The non-limiting and exemplary embodiments of the present disclosure generally relate to the technical field of communications, and specifically to methods and apparatuses for parameter configuration.

BACKGROUND

This section introduces aspects that may facilitate a better understanding of the disclosure. Accordingly, the statements of this section are to be read in this light and are not to be understood as admissions about what is in the prior art or what is not in the prior art.

In a wireless communication network, a server such as services capability server/an application server (SCS/AS) may issue network parameter configuration requests to the network, via a network device such as service capability exposure function (SCEF) or network exposure function (NEF), to suggest parameter values that may be used for parameters such as Maximum Latency, Maximum Response Time and Suggested Number of Downlink Packets, etc. By suggesting values for these parameters, the server such as SCS/AS may influence certain aspects of user equipment (UE)/network behavior such as the UE's power saving mode (PSM), extended idle mode discontinuous reception (DRX), and extended buffering configurations. For example based on operator's configuration, the network device such as SCEF/NEF and Home Subscriber Server (HSS) may choose to accept, reject or modify the suggested configuration parameter value. The network device such as SCEF/NEF may indicate accepted/modified values to the server such as SCS/AS. This feature can also be used to suggest parameter values for a group of UEs.

SUMMARY

In a first aspect of the disclosure, there is provided a method implemented at a server in a wireless communication network. The method may comprise sending to a network device a parameter provisioning request including one or more communication pattern (CP) parameter sets associated with respective CP parameter set identifiers. The method may further comprise receiving from the network device a parameter provisioning response including respective result of at least one of the one or more CP parameter sets indicating whether the at least one of the one or more CP parameter sets is provisioned successfully or not.

In a second aspect of the disclosure, there is provided a method implemented at a network device. The method may comprise receiving from a server a parameter provisioning request including one or more communication pattern (CP) parameter sets associated with respective CP parameter set identifiers. The method may further comprise generating a parameter provisioning response including respective result of at least one of the one or more CP parameter sets indicating whether the at least one of the one or more CP parameter sets is provisioned successfully or not. The method may further comprise sending the parameter provisioning response to the server.

In a third aspect of the disclosure, there is provided an apparatus implemented at a server in a wireless communication network. The apparatus may comprise a processor; and a memory coupled to the processor, said memory containing instructions executable by said processor, whereby said apparatus is operative to send to a network device a parameter provisioning request including one or more communication pattern (CP) parameter sets associated with respective CP parameter set identifiers; and receive from the network device a parameter provisioning response including respective result of at least one of the one or more CP parameter sets indicating whether the at least one of the one or more CP parameter sets is provisioned successfully or not.

In a fourth aspect of the disclosure, there is provided an apparatus implemented at a network device. The apparatus may comprise a processor; and a memory coupled to the processor, said memory containing instructions executable by said processor, whereby said apparatus is operative to receive from a server a parameter provisioning request including one or more communication pattern (CP) parameter sets associated with respective CP parameter set identifiers; generate a parameter provisioning response including respective result of at least one of the one or more CP parameter sets indicating whether the at least one of the one or more CP parameter sets is provisioned successfully or not; and send the parameter provisioning response to the server.

In a fifth aspect of the disclosure, there is provided an apparatus implemented at a server in a wireless communication network. The apparatus may comprise: a sending unit configured to send to a network device a parameter provisioning request including one or more communication pattern (CP) parameter sets associated with respective CP parameter set identifiers; and a receive unit configured to receive from the network device a parameter provisioning response including respective result of at least one of the one or more CP parameter sets indicating whether the at least one of the one or more CP parameter sets is provisioned successfully or not.

In a sixth aspect of the disclosure, there is provided an apparatus implemented at a network device. The apparatus may comprise: a receiving unit configured to receive from a server a parameter provisioning request including one or more communication pattern (CP) parameter sets associated with respective CP parameter set identifiers; a generating unit configured to generate a parameter provisioning response including respective result of at least one of the one or more CP parameter sets indicating whether the at least one of the one or more CP parameter sets is provisioned successfully or not; and a receiving unit configured to receiving the parameter provisioning response to the server.

In a seventh aspect of the disclosure, there is provided a computer program product, comprising instructions which, when executed on at least one processor, cause the at least one processor to carry out the method according to the first aspect of the disclosure.

In an eighth aspect of the disclosure, there is provided a computer program product, comprising instructions which, when executed on at least one processor, cause the at least one processor to carry out the method according to the second aspect of the disclosure.

In a ninth aspect of the disclosure, there is provided a computer-readable storage medium storing instructions which when executed by at least one processor, cause the at least one processor to carry out the method according to the first aspect of the disclosure.

In a tenth aspect of the disclosure, there is provided a computer-readable storage medium storing instructions which when executed by at least one processor, cause the at least one processor to carry out the method according to the second aspect of the disclosure.

Many advantages may be achieved by applying the proposed solution according to some embodiments of the present disclosure. For example, some embodiments of the present disclosure proposes an extension of the SCEF/NEF to be able to send respective result of at least one of one or more CP parameter sets indicating whether the at least one of the one or more CP parameter sets is provisioned successfully or not. Some embodiments of the present disclosure proposes an extension of the SCEF/NEF to be able to send the result for all the one or more CP parameter sets indicating whether they are provisioned successfully or not. Some embodiments of the present disclosure proposes an extension of the SCEF/NEF to be able to send only the result for a CP parameter set which is not been provisioned successfully.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless communication network" refers to a network following any suitable communication standards, such as LTE-Advanced (LTE-A), LTE, new radio (NR) and so on. In the following description, the terms "network" and "system" can be used interchangeably. Furthermore, the communications between a terminal device and a network device in the wireless network may be performed according to any suitable generation communication protocols, including, but not limited to fourth generation (4G) communication protocols such as LTE, fifth generation (5G) communication protocols such as NR, and/or any other protocols either currently known or to be developed in the future.

The term "network device" refers to a network device in a wireless communication network via which a terminal device accesses to the network and receives services therefrom. For example, in a wireless communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "network function (NF)" refers to any suitable function which can be implemented in a network device of a wireless communication network. For example, in 5G network, the network function may comprise a plurality of network functions (NFs) such as Authentication Server Function (AUSF), Access and Mobility Management Function (AMF), Data Network (DN) (e.g. operator services, Internet access or 3rd party services), Network Exposure Function (NEF), Network Repository Function (NRF), Network Slice Selection Function (NSSF), Policy Control Function (PCF), Session Management Function (SMF), Unified Data Management (UDM), User Plane Function (UPF), Application Function (AF), User Equipment (UE), (Radio) Access Network ((R)AN), 5G-Equipment Identity Register (5G-EIR), Security Edge Protection Proxy (SEPP), Network Data Analytics Function (NWDAF), Unified Data Repository (UDR), Unstructured Data Storage Function (UDSF), etc.

The term "terminal device" refers to any end device that can access a communication network and receive services therefrom. By way of example and not limitation, in the wireless communication network, the terminal device may refer to a mobile terminal, a user equipment (UE), or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

As used herein, a downlink, DL, transmission refers to a transmission from the network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
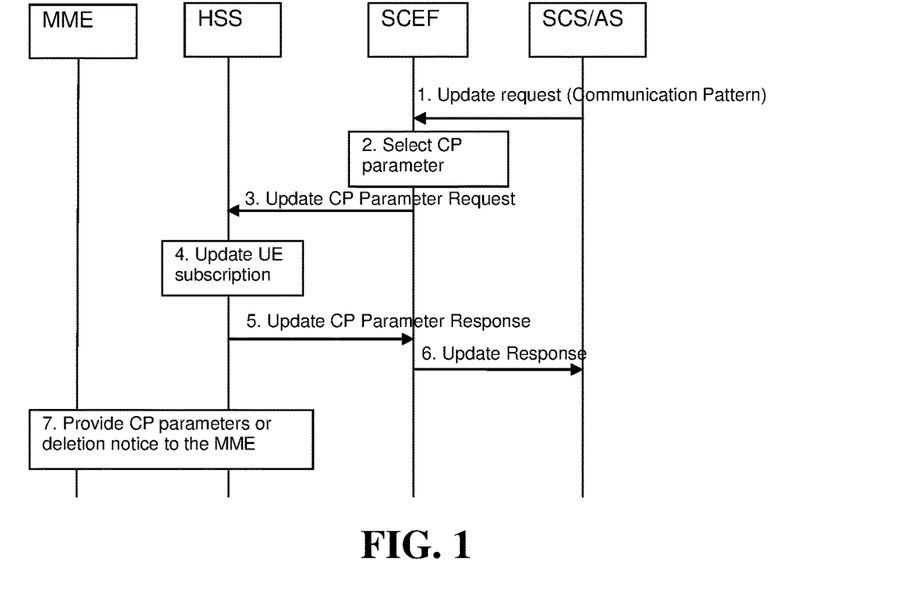
FIG. 1 shows a procedure for communication pattern (CP) parameters provisioning to a mobility management entity (MME)

Although the subject matter described herein may be implemented in any appropriate type of system using any suitable components, the embodiments disclosed herein are described in relation to a communication system comprising at least the components as illustrated in FIG. 1. For example, procedures for CP parameters provisioning according to some embodiments of the present disclosure can be applicable in 5G network with the following differences:

description of the server such as SCS/AS applies to the AF;

description of the network device such as SCEF applies to the NEF;

description of the network device such as HSS applies to the UDM;

the NEF shall interact with the UDM by using Nudm_ParameterProvision service as described in clause 5.2.3.6 of 3GPP TS23.502, the disclosure of which is incorporated by reference herein in its entirety.

FIG. 1 shows a procedure for communication pattern (CP) parameters provisioning to a mobility management entity (MME), which is a copy of clause 5.10.2 of 3GPP TS23.682, the disclosure of which is incorporated by reference herein in its entirety.

As shown in FIG. 1, at step 1/ the SCS/AS sends an Update Request (External Identifier or MSISDN (Mobile Subscriber Integrated Services for Digital Network Number) or External Group Identifier, SCS/AS Identifier, CP parameter Set Id(s), CP parameter set(s), validity time(s), CP parameter Set Id(s) for Deletion) message to the SCEF. The CP parameter set(s) include the parameters defined in Table 5.10.1-1. A CP parameter Set Id is assigned to each CP parameter set by the SCS/AS.

The SCS/AS uses this procedure to add, change or delete some or all of the CP parameter sets of the UE, e.g. if the AS is aware that the UE has started or stopped moving for a significant time period, especially if the AS is instructing the UE to do so, then the SCS/AS provides the corresponding CP parameter set(s) and its validity time(s) as well as their CP parameter Set Id(s) to the SCEF. If the SCS/AS wants to perform deletion of a previously configured CP parameter set(s) together with configuring a new CP parameter set(s), then it shall include both the new CP parameter set(s), and CP parameter Set Id(s) for Deletion representing the CP parameter set(s) which requires cancellation. If the SCS/AS wants to only perform deletion of a previously configured CP parameter set(s), then it shall include CP parameter Set Id(s) for Deletion.

At step 2, the SCEF checks if the SCS/AS is authorized to send CP requests to the UE or to each UE in the identified group. The SCEF filters and the selects the CP parameter set(s) for add/modify/delete based on operator policy or configuration. The SCEF does not check for potential overlapping of CP parameters if there are multiple CP parameter set(s) for the UE, but this is handled in the MME.

To avoid receiving CP parameter sets from multiple SCEFs that might be overlapping, the HSS shall accept CP parameter sets from only a single SCEF for a given UE.

At step 3, the SCEF sends Update CP Parameters Request (External Identifier or MSISDN or External Group Identifier, SCEF Reference ID(s), SCEF Address, CP parameter set(s), validity time(s), SCEF Reference ID(s) for Deletion) message to the HSS for delivering the selected CP parameter set(s) per UE. There may be multiple CP parameter sets included in this message where each CP parameter set for addition or modification has been determined to be non-overlapping with other CP parameter sets either included in the message or already provisioned for a given UE. The SCEF derives the SCEF Reference ID(s) for CP parameter sets to be sent to the HSS based on the CP parameter Set Id(s) from the SCS/AS.

A request for deletion of a CP parameter set from the SCS/AS may result in a request for modification of the non-overlapping CP parameter set by the SCEF.

At step 4, the HSS examines the Update CP Parameter Request message, e.g. with regard to the existence of External Identifier or MSISSN or External Group Identifier. If the check fails, the HSS immediately sends a response message back to the SCEF following step 5. The HSS resolves the External Identifier or MSISDN to an IMSI (International mobile subscriber identity) or resolves the External Group Identifier to an IMSI-Group Identifier and stores the CP parameter set(s) and their validity time(s) as part of UE subscription data identified by the IMSI or IMSI-Group Identifier, so that the CP parameter set(s) can be forwarded to the serving MME(s) when the serving MME(s) are changed due to the mobility of the UE.

The HSS determines that a stored CP parameters set is to be modified by the fact that the SCEF Reference ID associated with the CP parameters set matches an SCEF Reference ID for a CP parameters set already stored for a given UE. If the HSS determines that an existing CP parameter set is to be modified, the HSS discards the already stored CP parameter set and stores the new CP parameter set and validity time under the same SCEF Reference ID.

The HSS stores a new CP parameter set along with the associated SCEF Reference ID and validity time.

If CP parameters sets are to be deleted, the HSS removes the CP parameters sets from the subscription.

If the validity time for a CP parameter set stored in the HSS expires, the HSS autonomously deletes the associated CP parameter set with no additional signalling.

Note that the CP parameter set(s) are not provided to the SGSN.

Note that HSS does not need to validate the content of the stored CP parameters set(s).

At step 5, the HSS sends Update CP Parameter Response (SCEF Reference ID, Cause) message to the SCEF. The cause value indicates successful subscription update or the reason of failed subscription update.

At step 6, the SCEF sends the Update Response (CP parameter Set Id(s), Cause(s)) message to inform the SCS/AS whether the provision of the CP parameter set(s) was successful.

At step 7, the HSS initiates an Insert Subscription Data procedure for each UE to send the CP parameter set(s) with the corresponding validity time(s), SCEF Reference ID(s), and SCEF Reference ID(s) for Deletion to the MME.

The MME determines that a stored CP parameters set is to be modified by the fact that the SCEF Reference ID associated with the CP parameters set matches an SCEF Reference ID for a CP parameters set already stored for the UE. If the MME determines that an existing CP parameter set is to be modified, the MME discards the already stored CP parameter set and stores the received CP parameter set with the associated validity time in the UE's (E)MM context under the same SCEF Reference ID.

The MME stores a new CP parameter set along with the associated SCEF Reference ID and validity time. The MME may use the CP parameter set(s) as described in TS 23.401 [7].

If CP parameter sets are to be deleted, the MME removes the CP parameter sets from the subscription.

If the validity time for a CP parameter set stored in the MME expires, the MME autonomously deletes the associated CP parameter set with no additional signalling.

The procedure as shown in FIG. 1 allows the SCS/AS to request multiple CP parameter sets in one message. The Diameter command level result "success" doesn't mean all CP parameter set(s) are provisioned successfully, the HSS may indicate different provisioning results for the requested CP parameter sets, but currently the SCEF doesn't send any error indication for individual CP parameter set to the SCS/AS. A consequence is that for multiple CP parameter sets provisioning, the SCS/AS may wrongly believe that all CP parameter sets are provisioned successfully.

To overcome or mitigate the above mentioned problem or other problems or provide a useful solution, the embodiments of the present disclosure propose a solution. Some embodiments of the present disclosure proposes an extension of the SCEF/NEF to be able to send respective result of at least one of one or more CP parameter sets indicating whether the at least one of one or more CP parameter sets is provisioned successfully or not. Some embodiments of the present disclosure proposes an extension of the SCEF/NEF to be able to send the result for all the one or more CP parameter sets indicating whether they are provisioned successfully or not. Some embodiments of the present disclosure proposes an extension of the SCEF/NEF to be able to send only the result for a CP parameter set which is not been provisioned successfully.

Figure 2:
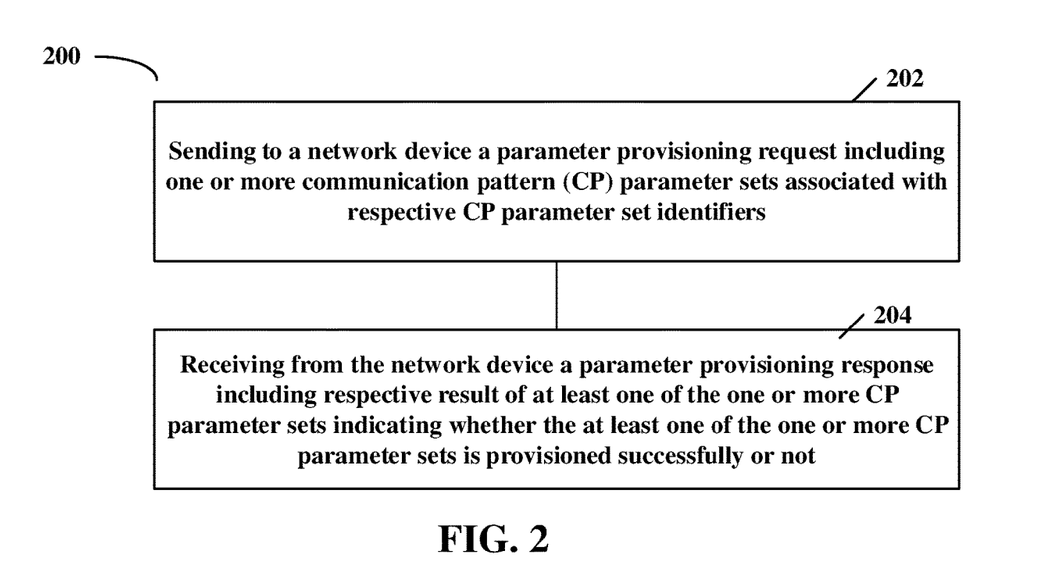
FIG. 2 shows a flowchart of a method according to an embodiment of the present disclosure.

FIG. 2 shows a flowchart of a method 200 according to an embodiment of the present disclosure, which may be performed by an apparatus implemented in a server or communicatively coupled to the server such as SCS/AS and AF. As such, the apparatus may provide means for accomplishing various parts of the method 200 as well as means for accomplishing other processes in conjunction with other components. The apparatus may be located in a wireless communication network. The apparatus may communicate with a network device such as SCEF or NEF in the wireless communication network.

At block 202, the server may send to a network device a parameter provisioning request including one or more communication pattern (CP) parameter sets associated with respective CP parameter set identifiers. The network device may be any suitable network device related to network parameter configuration. For example, the network device may be SCEF or NEF in the 3GPP wireless network.

In an embodiment, the one or more CP parameters may be specific for a UE or a group of UEs. In this case, the parameter provisioning request may further comprise an identifier of the UE or the group of UEs. The identifier of the UE or the group of UEs may take any suitable form such as External Identifier or MSISDN or External Group Identifier, but not limited thereto.

In an embodiment, each CP parameter set may have an associated validity time. The validity time may indicate when the CP parameter set expires and may be deleted by the involved nodes such as NEF/SCEF, HSS, and AMF/MME. The validity time may be set to a value indicating that the particular CP parameter set has no expiration time. When the validity time expires, the involved nodes such as NEF/SCEF, HSS, and AMF/MME may autonomously delete the associated CP parameter set with no additional signalling between the involved nodes. The format of the validity time may be defined in a manner which allows the involved nodes such as SCEF/NEF, HSS, and AMF/MME/SGSN (serving general packet radio service support Node) to consistently and uniformly interpret the expiration of the associated CP parameters set.

The one or more CP parameter sets may comprise any suitable CP parameters such as the CP parameter sets as defined in Table 5.10.1-1 of 3GPP TS23.683 or its future version. In an embodiment, the one or more CP parameter sets may comprise periodic communication indicator, communication duration time, periodic time, scheduled communication time, stationary indication, and traffic profile. Periodic communication indicator may identify whether the UE communicates periodically or not, e.g. only on demand Communication duration time may indicate duration interval time of periodic communication and may be used together with periodic communication indicator. An example of communication duration time may be 5 minutes. Periodic time may indicate interval time of periodic communication and may be used together with periodic communication indicator. An example of periodic time may be every hour. Scheduled communication time may indicate time zone and Day of the week when the UE is available for communication. An example of Scheduled communication time may be Time: 13:00-20:00, Day: Monday. Stationary indication may identify whether the UE is stationary or mobile. Battery indication may identify power consumption criticality for the UE: if the UE is battery powered with not rechargeable/not replaceable battery, battery powered with rechargeable/replaceable battery, or not battery powered. Traffic Profile may identify the type of data transmission: single packet transmission (UL or DL), dual packet transmission (UL with subsequent DL or DL with subsequent UL), multiple packets transmission.

The parameter provisioning request may further comprise any other suitable information. For example, the parameter provisioning request may include at least one of External Identifier (Id) or MSISDN or External Group Identifier, SCS/AS Identifier, CP parameter Set Id(s), CP parameter set(s), validity time(s), CP parameter Set Id(s) for Deletion. The CP parameter set(s) may include the parameters as describe above. A CP parameter Set Id may be assigned to each CP parameter set by the server such as AS.

The server such as SCS/AS may add, change or delete some or all of the CP parameter sets of the UE, e.g. if the server such as AS is aware that the UE has started or stopped moving for a significant time period, especially if the server such as AS/AF is instructing the UE to do so, then the server such as SCS/AS may provide the corresponding CP parameter set(s) and its validity time(s) as well their CP parameter Set Id(s) to the network node such as SCEF. If the server such as SCS/AS wants to perform deletion of a previously configured CP parameter set(s) together with configuring a new CP parameter set(s), then it shall include both the new CP parameter set(s), and CP parameter Set Id(s) for Deletion representing the CP parameter set(s) which requires cancellation. If the server such as SCS/AS wants to only perform deletion of a previously configured CP parameter set(s), then it shall include CP parameter Set Id(s) for Deletion.

When the network device receives the parameter provisioning request, it may generate a parameter provisioning response including respective result of at least one of the one or more CP parameter sets indicating whether the at least one of the one or more CP parameter sets is provisioned successfully or not and send the parameter provisioning response to the server. The detailed operations of the network device will be described in the following.

Then at block 204, the server may receive from the network device a parameter provisioning response including respective result of at least one of the one or more CP parameter sets indicating whether the at least one of the one or more CP parameter sets is provisioned successfully or not.

In an embodiment, the respective result of at least one of the one or more CP parameter sets may include the result for all the one or more CP parameter sets indicating whether they are provisioned successfully or not. For example, each CP parameter set may have a corresponding result to indicate whether it is provisioned successfully or not.

In an embodiment, the respective result of at least one of the one or more CP parameter sets may include only the result for a CP parameter set which is not been provisioned successfully. In this case, when the result does not include a result of a specific CP parameter set, it means that the specific CP parameter set has been provisioned successfully.

The result of one CP parameter set may take any suitable form such as status code. The status code may occupy any suitable number of bits for example depending on the number of status codes. For example, when there are two status codes where the status code "1" may indicate that the CP parameter set has been provisioned successfully and the status code "0" may indicate that the CP parameter set has not been provisioned successfully, or vice versa, the status code may occupy one bit. In this case, the respective result of at least one of the one or more CP parameter sets may take bitmap.

In an embodiment, a format of the result of a CP parameter set may comprise a CP parameter set identifier and a corresponding result code. The data type of the CP parameter set identifier may be array (string).

In an embodiment, the result code may comprise a failure code and a success code. The failure code may identify a specific failure reason. For example, the failure reason may identify at least one of malfunction, a CP parameter set identifier being duplicated, and other reason. The malfunction may indicate that something functions wrongly in CP parameter provisioning or the CP parameter provisioning does not function at all. The CP parameter set identifier being duplicated may indicate that the received CP parameter set identifier(s) are already provisioned. The other reason may indicate other reason unspecified. There may be any other suitable types of failure codes in other embodiments. The failure code can be expressed in any suitable number of bits for example depending on the number of the failure reasons. For example, when there are three failure reasons, then the failure code may occupy two bits.

In an embodiment, the parameter provisioning request may be included in a Hypertext Transfer Protocol (HTTP) POST message for creating resources for the one or more CP parameter sets, and the parameter provisioning response may be included in an HTTP POST response. The HTTP POST message may be of any suitable formats. For example, the HTTP POST message may be similar or same as the HTTP POST request as defined in Table 5.10.3.2.3.4-1 of 3GPP TS29.122, the disclosure of which is incorporated by reference herein in its entirety. The HTTP POST response may be of any suitable formats. For example, the HTTP POST response may be similar or same as the HTTP POST response as defined in Table 5.10.3.2.3.4-1 of 3GPP TS29.122 except that the HTTP POST response according to embodiments of the disclosure further includes respective result of at least one of the one or more CP parameter sets indicating whether the at least one of the one or more CP parameter sets is provisioned successfully or not.

For example, in the 3GPP network as shown in FIG. 1, in order to create resources for one or more CP parameter set(s), the SCS/AS may send an HTTP POST message to the SCEF for the "CP provisioning Subscription" resource, including one or more new provisioned CP parameter set(s). The body of HTTP POST message shall include External Identifier or MSISDN for a single UE or External Group ID for a group of Ues, SCS/AS Identifier and one or more set of CP information associated with CP parameter set Id(s). If the ExpectedUMT_5G feature is supported, the expected UE moving trajectory within the "expectedUmts" attribute shall also be included. After receiving the HTTP POST message, the SCEF shall check if the SCS/AS is authorised. The SCEF may also check if the number of CP parameter sets(s) reaches the limitation based on operator policy or configuration. After validation, the SCEF shall for each received CP parameter set Id, assign an SCEF Reference ID which may be derived from the CP parameter set Id, and send Update CP Parameter Request message to the HSS for delivering the CP parameter set(s) as specified in 3GPP TS 29.336, the disclosure of which is incorporated by reference herein in its entirety. After receiving successful result from the HSS, the SCEF shall create a resource "Individual CP Provisioning Subscription" and all sub-resources "Individual CP set Provisioning" which represents a CP parameter set. The SCEF shall respond to the SCS/AS with a 201 Created including Location header field containing the URI for the created subscription resource "Individual CP Provisioning Subscription" and the sub-resource(s) "Individual CP set Provisioning" each within the "self" attribute in the "cpParameterSet" attribute; otherwise, the SCEF shall not create any resource and shall respond to the SCS/AS with a status code set to 500 Internal Server Error. The SCEF shall also include CP report(s) with a list of CP parameter set Identifier(s) and result(s) in the body of the HTTP response if some CP parameter set(s) are not provisioned successfully (for example the HSS returns failure and/or the SCEF does not accept the CP parameter provisioning (e.g. one or more CP parameter set Identifiers in the request are already present in existing subscriptions)).

In an embodiment, the parameter provisioning request may be included in a Hypertext Transfer Protocol (HTTP) PUT message for adding or updating the one or more CP parameter sets, and the parameter provisioning response may be included in an HTTP PUT response. The HTTP PUT message may be of any suitable formats. For example, the HTTP PUT message may be similar or same as the HTTP PUT request as defined in Table 5.10.3.3.3.2 of 3GPP TS29.122. The HTTP PUT response may be of any suitable formats. For example, the HTTP PUT response may be similar or same as the HTTP PUT response as defined in Table 5.10.3.3.3.2 of 3GPP TS29.122 except that the HTTP PUT response according to embodiments of the disclosure further includes respective result of at least one of the one or more CP parameter sets indicating whether the at least one of the one or more CP parameter sets is provisioned successfully or not.

For example, in the 3GPP network as shown in FIG. 1, in order to add new CP parameter set(s), update and/or remove the existing CP parameter set(s) for one or more CP parameter set Id(s), the SCS/AS may send an HTTP PUT message to the SCEF for the "Individual CP Provisioning Subscription" resource requesting to add new CP parameter set(s) by creating new resource(s), change some created properties (e.g. Validity Time) of the existing resource(s), and/or remove some or entire properties of the existing resource(s). After receiving the HTTP PUT message, the SCEF shall send the CP parameter changes to the HSS as specified in 3GPP TS 29.336. After receiving the response from the HSS with a successful code, the SCEF shall update the resource (s) and send an HTTP response to the SCS/AS with a 200 OK status code and include a list of CP parameter set Id(s) in the body of the HTTP response. Otherwise, the SCEF shall not update the resource and shall send an HTTP response to the SCS/AS with a status code set to 500 Internal Server Error. The SCEF shall also include CP report(s) with a list of CP parameter set Identifier(s) and result(s) in the body of the HTTP response if some CP parameter set(s) are not provisioned successfully (e.g. the HSS returns failure and/or the SCEF does not accept the CP parameter provisioning (e.g. one or more CP parameter set Identifiers in the request are already present in existing subscriptions)).

For the HTTP POST message to the resource "CP provisioning Subscription" or the HTTP PUT message to the resource "Individual CP Provisioning Subscription", if the provisioning of all application(s) fails (e.g. the HSS returns failure for all sets and/or the SCEF does not accept the PFD provisioning), the SCEF shall respond with 500 Internal Server Error response, and include the corresponding failure code and the CP parameter set Identifier(s) for which the provisioning has failed.

In an embodiment, the parameter provisioning request may be included in a Hypertext Transfer Protocol (HTTP) PUT message for updating one CP parameter set, and the parameter provisioning response may be included in an HTTP PUT response. The HTTP PUT message may be of any suitable formats. For example, the HTTP PUT message may be similar or same as the HTTP PUT request as defined in Table 5.10.3.4.3.2-1 of 3GPP TS29.122. The HTTP PUT response may be of any suitable formats. For example, the HTTP PUT response may be similar or same as the HTTP PUT response as defined in Table 5.10.3.4.3.2-1 of 3GPP TS29.122 except that the HTTP PUT response according to embodiments of the disclosure further includes respective result of at least one of the one or more CP parameter sets indicating whether the at least one of the one or more CP parameter sets is provisioned successfully or not.

For example, in the 3GPP network as shown in FIG. 1, the SCS/AS may send a HTTP PUT message to the SCEF for the "Individual CP set Provisioning" resource requesting to replace an individual resource identified by the CP parameter set Id. The body of the HTTP PUT message shall include set of CP information. After receiving such request, the SCEF shall interact with the HSS as specified in 3GPP TS 29.336. After receiving the response from the HSS with a successful code, the SCEF shall update the resource and send an HTTP response to the SCS/AS with a 200 OK status code; otherwise, the SCEF shall not update the resource and shall send an HTTP response to the SCS/AS with a status code set to 500 Internal Server Error. If the provisioning of the CP parameter set fails (e.g. the HSS returns failure for the CP parameter set or the SCEF does not accept the CP set provisioning), the SCEF shall reject the request with a corresponding status code, and include the corresponding failure code and the CP parameter set Identifier for which the provisioning has failed.

In an embodiment, a CP report referred to as CpReport may be defined in table 1 to indicate the CP parameter set identifier(s) which is/are not added or modified successfully and corresponding failure reason(s).

TABLE 1

Definition of type CpReport

| Attribute name | Data type | Cardinality | Description | Applicability (NOTE) |
|---|---|---|---|---|
| setIds | array(string) | 1 ... N | Identifies the CP set identifier(s) which CP parameter(s) are not added or modified successfully | |
| failureCode | CpFailureCode | 1 | Identifies the failure reason | |

NOTE:
Properties marked with a feature as defined in subclause 5.11.4 of 3GPP TS29.122 are applicable as described in subclause 5.2.7 of 3GPP TS29.122. If no features are indicated, the related property applies for all the features.

In an embodiment, Table 5.10.2.1.2-1 of 3GPP TS29.122 may be revised to Table 2 to incorporate the CpReport as described above.

TABLE 2

Definition of type CpInfo

| Attribute name | Data type | Cardinality | Description | Applicability (NOTE 2) |
|---|---|---|---|---|
| supportedFeatures | SupportedFeatures | 0 ... 1 | Used to negotiate the supported optional features of the API as described in subclause 5.2.7. This attribute shall be provided in the POST request and in the response of successful resource creation. | |
| externalId | ExternalId | 0 ... 1 | Each element uniquely identifies a user as defined in Clause 4.6.2 of 3GPP TS 23.682 [2]. (NOTE 1) | |
| msisdn | Msisdn | 0 ... 1 | Each element identifies the MS internal PSTN/ISDN number allocated for a UE. (NOTE 1) | |
| externalGroupId | ExternalGroupId | 0 ... 1 | Identifies a user group as defined in Clause 4.6.2 of 3GPP TS 23.682 [2]. (NOTE 1) | |
| cpParameterSet | map(CpParameterSet) | 1 ... N | Identifies a set of CP parameter information that may be part of this CpInfo structure. | |
| cpReports | map(CpReport) | 0 ... N | Supplied by the SCEF and contains the CP set identifiers for which CP parameter(s) are not added or modified successfully. The failure reason is also included. Each element provides the related information for one or more CP set identifier(s) and is identified in the map via the failure identifier as key. | |

NOTE 1:
One of the properties "externalId", "msisdn" or "externalGroupId" shall be included.
NOTE 2:
Properties marked with a feature as defined in subclause 5.10.4 of 3GPP TS29.122 are applicable as described in subclause 5.2.7 of 3GPP TS29.122. If no feature are indicated, the related property applies for all the features.

In an embodiment, the failure code referred to as CpFailureCode representing the failure reason of the CP parameter provisioning may be defined in Table 3.

TABLE 3

CpFailureCode

| Enumeration value | Description | Applicability (NOTE) |
|---|---|---|
| MALFUNCTION | This value indicates that something functions wrongly in CP parameter provisioning or the CP parameter provisioning does not function at all. | |

TABLE 3-continued

| CpFailureCode | | |
|---|---|---|
| Enumeration value | Description | Applicability (NOTE) |
| SET_ID_DUPLICATED | The received CP set identifier(s) are already provisioned. | |
| OTHER_REASON | Other reason unspecified. | |

NOTE:
Properties marked with a feature as defined in subclause 5.11.4 of 3GPP TS29.122 are applicable as described in subclause 5.2.7 of 3GPP TS29.122. If no features are indicated, the related property applies for all the features.

In an embodiment, Table 5.10.3.2.3.4-1 of 3GPP TS29.122 may be revised to Table 4 to incorporate the CpReport as described above.

TABLE 4

| | Data type | Cardinality | | Remarks |
|---|---|---|---|---|
| Request body | CpInfo | 1 | | Change information in CP parameter set. |

| | Data type | Cardinality | Response codes | Remarks |
|---|---|---|---|---|
| Response body | CpInfo | 1 | 201 Created | The subscription was created successfully. The SCEF shall return the created subscription in the response payload body. CpReport may be included to provide detailed failure information for some CP sets. |
| | array(CpReport) | 1...N | 500 Internal Server Error | The CP parameters for all CP sets were not created successfully. CpReport is included with detailed information. |

NOTE:
In addition to the above response codes, the SCEF can also send the HTTP response codes in table 5.2.6-1 of 3GPP TS29.122.

In an embodiment, 5.10.3.3.3.2-1 of 3GPP TS29.122 may be revised to Table 5 to incorporate the CpReport as described above.

TABLE 5

| | Data type | Cardinality | | Remarks |
|---|---|---|---|---|
| Request body | CpInfo | 1 | | Change information in CP parameter set(s). |

| | Data type | Cardinality | Response codes | Remarks |
|---|---|---|---|---|
| Response body | CpInfo | 1 | 200 OK | The subscription was modified successfully. The SCEF shall return an updated subscription in the response payload body. CpReport may be included to provide detailed failure information for some CP sets. |
| | array(CpReport) | 1...N | 500 Internal Server Error | The CP parameters for all CP sets were not created successfully. CpReport is included with detailed information. |

NOTE:
In addition to the above response codes, the SCEF can also send the HTTP response codes in table 5.2.6-1 of 3GPP TS29.122.

In an embodiment, 5.10.3.4.3.2-1 of 3GPP TS29.122 may be revised to Table 6 to incorporate the CpReport as described above.

TABLE 6

| | Data type | Cardinality | | Remarks |
|---|---|---|---|---|
| Request body | CpParameterSet | 1 | | Change information in CP parameter set. |

| | Data type | Cardinality | Response codes | Remarks |
|---|---|---|---|---|
| Response body | CpParameterSet | 1 | 200 OK | The CP parameter set resource was modified successfully. The SCEF shall return an updated CP parameter set resource in the response payload body. |
| | CpReport | 1 | 409 Conflict | The CP parameters for the CP set were not updated successfully, applicable for error SET_ID_DUPLICATED in table 5.10.2.3.X-1. |
| | CpReport | 1 | 500 Internal Server Error | The CP parameters for the CP set were not updated successfully, applicable for other errors in table 5.10.2.3.X-1. |

NOTE:
In addition to the above response codes, the SCEF can also send the HTTP response codes in table 5.2.6-1 of 3GPP TS29.122.

In an embodiment, the server may comprise a services capability server/an application server (SCS/AS) or an application function (AF) and the network device may comprise a service capability exposure function (SCEF) or a network exposure function (NEF).

In an embodiment, the one or more CP parameter sets and the respective result of at least one of the one or more CP parameter sets are to be used by mobility management entity (MME) and/or access and mobility management function (AMF).

Figure 3:
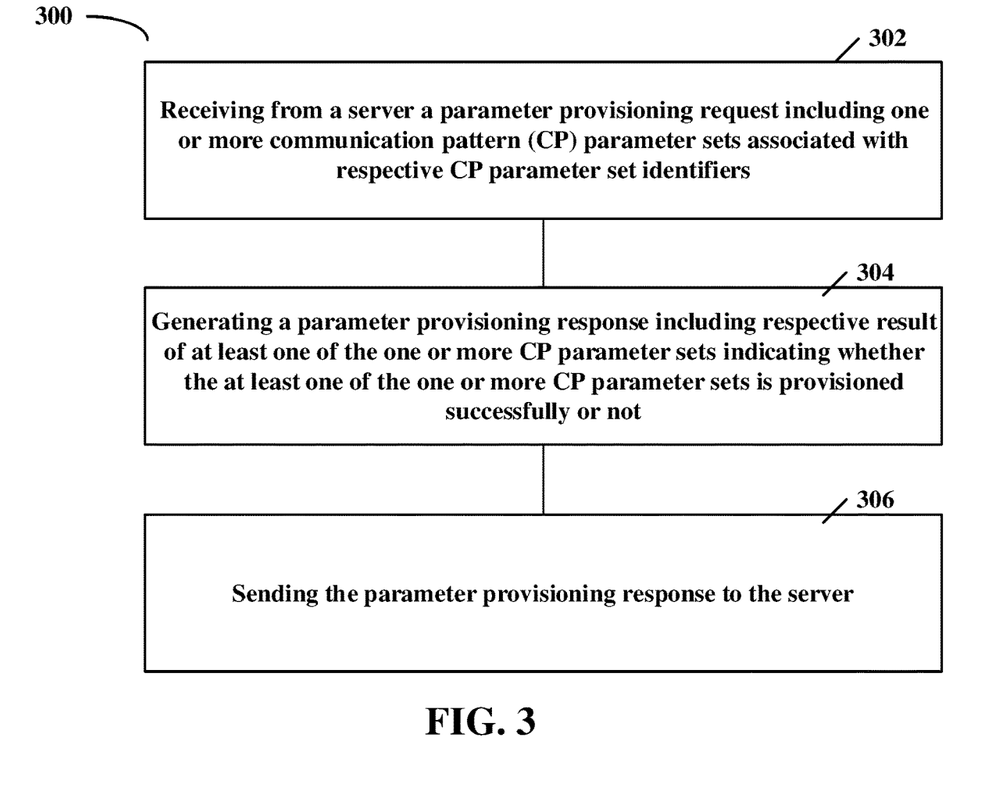
FIG. 3 shows a flowchart of a method according to another embodiment of the present disclosure.

FIG. 3 shows a flowchart of a method 300 according to an embodiment of the present disclosure, which may be performed by an apparatus implemented in a network device or communicatively coupled to the network device such as the SCEF or NEF. As such, the apparatus may provide means for accomplishing various parts of the method 300 as well as means for accomplishing other processes in conjunction with other components. For some parts which have been described in the above embodiments, detailed description thereof is omitted here for brevity.

At block 302, the network device may receive from a server a parameter provisioning request including one or more communication pattern (CP) parameter sets associated with respective CP parameter set identifiers. For example, the server may send the parameter provisioning request at block 202 of FIG. 2, then the network device may receive the parameter provisioning request.

In an embodiment, the one or more CP parameters may be specific for a UE or a group of UEs as described above. In an embodiment, each CP parameter set may have an associated validity time as described above. In an embodiment, the one or more CP parameter sets may comprise periodic communication indicator, communication duration time, periodic time, scheduled communication time, stationary indication, and traffic profile.

At block 304, the network device may generate a parameter provisioning response including respective result of at least one of the one or more CP parameter sets indicating whether the at least one of the one or more CP parameter sets is provisioned successfully or not.

In an embodiment, the respective result of at least one of the one or more CP parameter sets may include the result for all the one or more CP parameter sets indicating whether they are provisioned successfully or not.

In an embodiment, the respective result of at least one of the one or more CP parameter sets may include only the result for a CP parameter set which is not been provisioned successfully.

In an embodiment, a format of the result of a CP parameter set may comprise a CP parameter set identifier and a corresponding result code.

In an embodiment, the corresponding result code may comprises a failure code. The failure code may identify at least one of malfunction; a CP parameter set identifier being duplicated; and other reason.

At block 306, the network device may send the parameter provisioning response to the server.

In an embodiment, the parameter provisioning request may be included in a Hypertext Transfer Protocol (HTTP) POST message for creating resources for the one or more CP parameter sets. The parameter provisioning response may be included in an HTTP POST response. The network device may generate the parameter provisioning response by checking if the server is authorized and/or if a number of one or more CP parameter sets reaches a limitation based on an operator policy or configuration and/or if the one or more CP parameter sets in the POST message were already provisioned as existing resources; based on the checking result, performing assigning a reference identifier for each of the one or more CP parameter sets, sending an update CP parameter request to HSS and/or UDM, receiving an update CP parameter response from the HSS and/or UDM, when the update CP parameter response indicating a successful result, creating a resource "Individual CP Provisioning Subscription" and all sub-resources "Individual CP set Provisioning" which represents a CP parameter set; and generating the parameter provisioning response based on the checking result and the update CP parameter response. In an embodiment, the HTTP POST response may comprise a response code 201 created or a response code 500 internal server error.

In an embodiment, the parameter provisioning request may be included in a Hypertext Transfer Protocol (HTTP) PUT message for adding or updating the one or more CP parameter sets. The parameter provisioning response may be included in an HTTP PUT response. The network device may generate the parameter provisioning response by checking if the server is authorized and/or if a number of one or more CP parameter sets reaches a limitation based on an operator policy or configuration and/or if the one or more CP parameter sets in the PUT message were already provisioned as existing resources; based on the checking result, performing sending a CP parameter change message to Home Subscriber Server (HSS) and/or Unified Data Management (UDM); receiving a CP parameter change response from the HSS and/or UDM; when the CP parameter change response includes a successful code, updating resource related to the one or more CP parameter sets; and generating the parameter provisioning response based on the checking result and the CP parameter change response. In an embodiment, the HTTP PUT response comprises a response code 200 OK or a response code 500 internal server error.

In an embodiment, the parameter provisioning request may be included in a Hypertext Transfer Protocol (HTTP) PUT message for updating the one CP parameter set. The parameter provisioning response may be included in an HTTP PUT response. The network device may generate the parameter provisioning response by checking if the server is authorized and/or if the CP parameter set in the PUT message was already provisioned as existing resource; based on the checking result, performing sending a CP parameter update message to Home Subscriber Server (HSS) and/or Unified Data Management (UDM), receiving a CP parameter update response from the HSS and/or UDM, when the CP parameter update response includes a successful code, updating resource related to the one CP parameter set; and generating the parameter provisioning response based on the check result and the CP parameter update response. In an embodiment, the HTTP PUT response may comprise a response code 200 OK or a response code 409 conflict or a response code 500 internal server error.

In an embodiment, the server comprises a services capability server/an application server (SCS/AS) or an application function (AF) and the network device comprises a service capability exposure function (SCEF) or a network exposure function (NEF).

In an embodiment, the one or more communication pattern (CP) parameter sets and the respective result of at least one of the one or more CP parameter sets are to be used by mobility management entity (MME) and/or access and mobility management function (AMF).

The various blocks shown in FIGS. 2-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 4A:
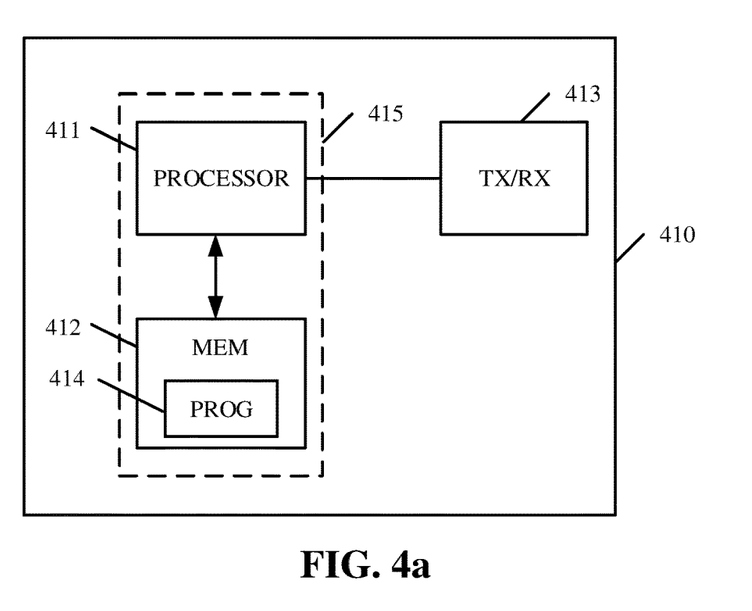
FIG. 4a illustrates simplified block diagrams of an apparatus according to an embodiment of the present disclosure.
Figure 4B:
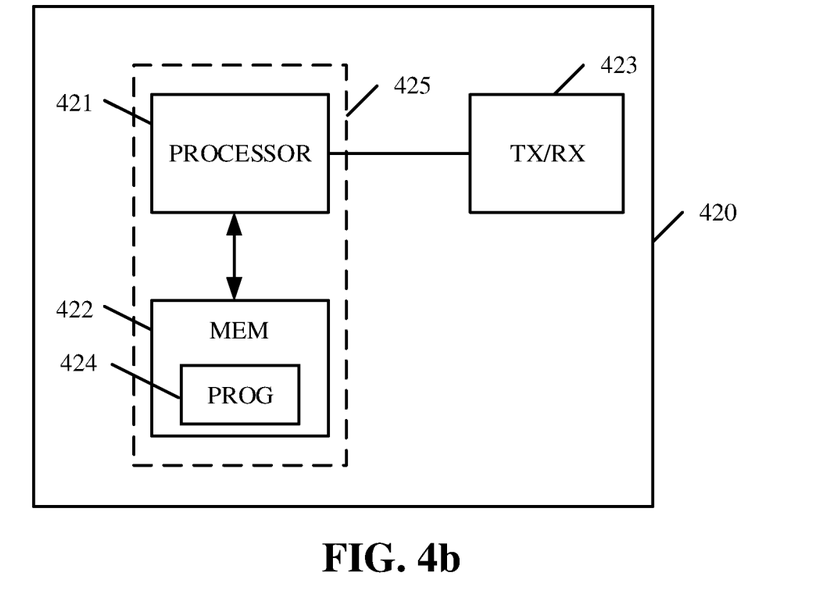
FIG. 4b illustrates simplified block diagrams of an apparatus according to another embodiment of the present disclosure.

FIG. 4a illustrates a simplified block diagram of an apparatus 410 that may be embodied in/as a server in a wireless communication network according to an embodiment of the present disclosure. FIG. 4b illustrates an apparatus 420 that may be embodied in/as a network device according to an embodiment of the present disclosure.

The apparatus 410 may comprise at least one processor 411, such as a data processor (DP) and at least one memory (MEM) 412 coupled to the processor 411. The apparatus 410 may further comprise a transmitter TX and receiver RX 413 coupled to the processor 411. The MEM 412 stores a program (PROG) 414. The PROG 414 may include instructions that, when executed on the associated processor 411, enable the apparatus 410 to operate in accordance with the embodiments of the present disclosure, for example to perform the method 200. A combination of the at least one processor 411 and the at least one MEM 412 may form processing means 415 adapted to implement various embodiments of the present disclosure.

The apparatus 420 comprises at least one processor 421, such as a DP, and at least one MEM 422 coupled to the processor 421. The apparatus 420 may further comprise a transmitter TX and receiver RX 423 coupled to the processor 421. The MEM 422 stores a PROG 424. The PROG 424 may include instructions that, when executed on the associated processor 421, enable the apparatus 420 to operate in accordance with the embodiments of the present disclosure, for example to perform the method 300. A combination of the at least one processor 421 and the at least one MEM 422 may form processing means 425 adapted to implement various embodiments of the present disclosure.

Various embodiments of the present disclosure may be implemented by computer program executable by one or more of the processors 411 and 421, software, firmware, hardware or in a combination thereof.

The MEMs 412 and 422 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 411 and 421 may be of any type suitable to the local technical environment, and may include one or more of general purpose computers, special purpose computers, microprocessors, digital signal processors DSPs and processors based on multicore processor architecture, as non-limiting examples.

Figure 5:
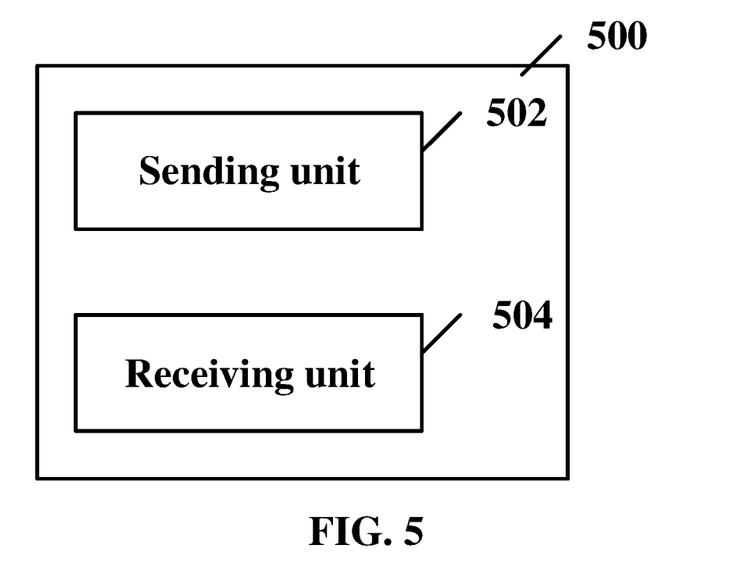
FIG. 5 illustrates simplified block diagrams of an apparatus according to another embodiment of the present disclosure.

Reference is now made to FIG. 5, which illustrates a schematic block diagram of an apparatus 500 implemented at a server in a wireless communication network. The apparatus 500 is operable to carry out the exemplary method 200 and possibly any other processes or methods.

As shown in FIG. 5, the apparatus 500 may comprise: a sending unit 502 configured to send to a network device a parameter provisioning request including one or more communication pattern (CP) parameter sets associated with respective CP parameter set identifiers; and a receive unit 504 configured to receive from the network device a parameter provisioning response including respective result of at least one of the one or more CP parameter sets indicating whether the at least one of the one or more CP parameter sets is provisioned successfully or not.

Figure 6:
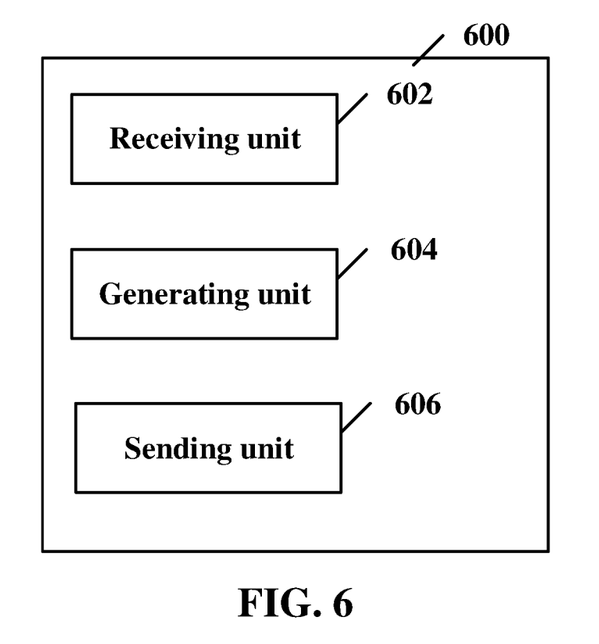
FIG. 6 illustrates simplified block diagrams of an apparatus according to another embodiment of the present disclosure.

Reference is now made to FIG. 6, which illustrates a schematic block diagram of an apparatus 600 implemented at a network device. The apparatus 600 is operable to carry out the exemplary method 300 and possibly any other processes or methods.

As shown in FIG. 6, the apparatus 600 may comprise: a receiving unit 602 configured to receive from a server a parameter provisioning request including one or more communication pattern (CP) parameter sets associated with respective CP parameter set identifiers; a generating unit 604 configured to generate a parameter provisioning response including respective result of at least one of the one or more CP parameter sets indicating whether the at least one of the one or more CP parameter sets is provisioned successfully or not; and a receiving unit 606 configured to receiving the parameter provisioning response to the server.

It would be appreciated that, some units or modules in the apparatus 500 and 600 can be combined in some implementations. For example, in one embodiment, it is possible to use a single transceiving unit to send and receive information.

According to an aspect of the disclosure it is provided a computer program product being tangibly stored on a computer readable storage medium and including instructions which, when executed on at least one processor, cause the at least one processor to carry out any of the methods related to the server as described above.

According to an aspect of the disclosure it is provided a computer program product being tangibly stored on a computer readable storage medium and including instructions which, when executed on at least one processor, cause the at least one processor to carry out any of the methods related to the network device as described above.

According to an aspect of the disclosure it is provided a computer-readable storage medium storing instructions which when executed by at least one processor, cause the at least one processor to carry out any of the methods related to the server as described above.

According to an aspect of the disclosure it is provided a computer-readable storage medium storing instructions which when executed by at least one processor, cause the at least one processor to carry out any of the methods related to the network device as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a server in a wireless communication network, comprising:
    sending to a network device a parameter provisioning request including communication pattern (CP) parameter sets associated with respective CP parameter set identifiers for provisioning the CP parameter sets; and
    receiving from the network device a parameter provisioning response to the parameter provisioning request with a result including a respective indicator for each CP parameter set of the CP parameter sets having been provisioned successfully or not provisioned successfully.

2. The method according to claim 1, wherein the result includes respective indicators for CP parameter sets that are provisioned successfully and not provisioned successfully to indicate which CP parameter sets are provisioned and which CP parameter sets are not provisioned.

3. The method according to claim 1, wherein the CP parameter sets are specific for a user equipment (UE) or a group of UEs; wherein at least one of the CP parameter sets has respective associated validity time; and wherein the CP parameter sets comprise one or more of a periodic communication indicator, a communication duration time, a periodic time, a scheduled communication time, a stationary indication, and a traffic profile.

4. The method according to claim 1, wherein a format of the result for a CP parameter set comprises a corresponding CP parameter set identifier and a corresponding result code, wherein the corresponding result code comprises a failure code identifying one or more of a malfunction, a CP parameter set identifier being duplicated, and a reason associated with the corresponding result code.

5. The method according to claim 1, wherein the parameter provisioning request is included in a Hypertext Transfer Protocol (HTTP) POST message for creating resources for the CP parameter sets, and the parameter provisioning response is included in an HTTP POST response.

6. The method according to claim 1, wherein the parameter provisioning request is included in a Hypertext Transfer Protocol (HTTP) PUT message for adding the CP parameter sets, and the parameter provisioning response is included in an HTTP PUT response.

7. The method according to claim 1, wherein the parameter provisioning request is included in a Hypertext Transfer Protocol (HTTP) PUT message for updating the CP parameter sets, and the parameter provisioning response is included in an HTTP PUT response.

8. The method according to claim 1, wherein the server comprises a services capability server/application server (SCS/AS) or an application function (AF), and the network device comprises a service capability exposure function (SCEF) or a network exposure function (NEF).

9. The method according to claim 1, wherein the CP parameter sets and the result are to be used by a mobility management entity (MME), an access and mobility management function (AMF), or by both the MME and the AMF.

10. A method implemented at a network device, comprising:
receiving from a server a parameter provisioning request including communication pattern (CP) parameter sets associated with respective CP parameter set identifiers for provisioning the CP parameter sets;
generating a parameter provisioning response to the parameter provisioning request with a result including a respective indicator for each CP parameter set of the CP parameter sets having been provisioned successfully or not provisioned successfully; and
sending the parameter provisioning response to the server.

11. The method according to claim 10, wherein the result includes respective indicators for CP parameter sets that are provisioned successfully and not provisioned successfully to indicate which CP parameter sets are provisioned and which CP parameter sets are not provisioned.

12. The method according to claim 10, wherein the CP parameter sets are specific for a user equipment (UE) or a group of UEs; wherein at least one of the CP parameter sets has respective associated validity time; and wherein the CP parameter sets comprise one or more of a periodic communication indicator, a communication duration time, a periodic time, a scheduled communication time, a stationary indication, and a traffic profile.

13. The method according to claim 10, wherein a format of the result for a CP parameter set comprises a corresponding CP parameter set identifier and a corresponding result code, wherein the corresponding result code comprises a failure code identifying one or more of a malfunction, a CP parameter set identifier being duplicated, and a reason associated with the corresponding result code.

14. The method according to claim 10, wherein the parameter provisioning request is included in a Hypertext Transfer Protocol (HTTP) POST message for creating resources for the CP parameter sets, the parameter provisioning response is included in an HTTP POST response, and generating the parameter provisioning response comprises:
checking if the server is authorized, or if a number of the CP parameter sets reaches a limitation based on an operator policy or configuration, or if the CP parameter sets in the HTTP POST message were already provisioned as existing resources, or a combination thereof;
based on a result of the checking, performing:
assigning a reference identifier for each of the CP parameter sets;
sending an update CP parameter request to a Home Subscriber Server (HSS) or a Unified Data Management (UDM), or both the HSS and the UDM;
receiving an update CP parameter response from the HSS, the UDM, or both the HSS and the UDM; and
in response to the update CP parameter response indicating a successful result, creating a resource "Individual CP Provisioning Subscription" and all sub-resources "Individual CP set Provisioning"; and
generating the parameter provisioning response based on the result of the checking and the update CP parameter response.

15. The method according to claim 10, wherein the parameter provisioning request is included in a Hypertext Transfer Protocol (HTTP) PUT message for adding the CP parameter sets, the parameter provisioning response is included in an HTTP PUT response, and generating the parameter provisioning response comprises:
checking if the server is authorized or if a number of one or more CP parameter sets reaches a limitation based on an operator policy or configuration, or if the CP parameter sets in the HTTP PUT message were already provisioned as existing resources, or a combination thereof;
based on a result of the checking, performing:
sending a CP parameter change message to a Home Subscriber Server (HSS) or a Unified Data Management (UDM), or both the HSS and UDM;
receiving a CP parameter change response from the HSS, the UDM, or both the HSS and UDM; and
when the CP parameter change response includes a successful code, adding a resource related to the CP parameter sets; and
generating the parameter provisioning response based on the result of the checking and the CP parameter change response.

16. The method according to claim 10, wherein the parameter provisioning request is included in a Hypertext Transfer Protocol (HTTP) PUT message for updating the CP parameter sets, the parameter provisioning response is included in an HTTP PUT response, and generating the parameter provisioning response comprises:
checking if the server is authorized or if the CP parameter set in the HTTP PUT message was already provisioned as existing resource, or both;

based on a result of the checking, performing:
  sending a CP parameter update message to a Home Subscriber Server (HSS) or a Unified Data Management (UDM), or both the HSS and UDM;
  receiving a CP parameter update response from the HSS, the UDM, or both the HSS and UDM; and
  when the CP parameter update response includes a successful code, updating a resource related to the CP parameter sets; and
  generating the parameter provisioning response based on the check result and the CP parameter update response.

17. The method according to claim 10, wherein the server comprises a services capability server/application server (SCS/AS) or an application function (AF), and the network device comprises a service capability exposure function (SCEF) or a network exposure function (NEF).

18. The method according to claim 10, wherein the CP parameter sets and the result are to be used by mobility management entity (MME), an access and mobility management function (AMF), or by both the MME and AMF.

19. An apparatus implemented at a server in a wireless communication network, comprising:
  a processor; and
  a memory coupled to the processor, said memory containing instructions which, when executed by said processor, cause said apparatus to:
    send to a network device a parameter provisioning request including communication pattern (CP) parameter sets associated with respective CP parameter set identifiers for provisioning the CP parameter sets; and
    receive from the network device a parameter provisioning response to the parameter provisioning request with a result including a respective indicator for each CP parameter set of the CP parameter sets having been provisioned successfully or not provisioned successfully.

20. An apparatus implemented at a network device, comprising:
  a processor; and
  a memory coupled to the processor, said memory containing instructions which, when executed by said processor cause said apparatus to:
    receive from a server a parameter provisioning request including communication pattern (CP) parameter sets associated with respective CP parameter set identifiers for provisioning the CP parameter sets;
    generate a parameter provisioning response to the parameter provisioning request with a result including a respective indicator for each CP parameter set of the CP parameter sets having been provisioned successfully or not provisioned successfully; and
    send the parameter provisioning response to the server.

* * * * *

UNITED STATES PATENT AND TRADEMARK OFFICE
CERTIFICATE OF CORRECTION

| | | |
|---|---|---|
| PATENT NO. | : 12,075,320 B2 | Page 1 of 1 |
| APPLICATION NO. | : 17/285101 | |
| DATED | : August 27, 2024 | |
| INVENTOR(S) | : Wenliang Xu | |

It is certified that error appears in the above-identified patent and that said Letters Patent is hereby corrected as shown below:

On the Title Page

Item (56), under "OTHER PUBLICATIONS", in Column 1, Line 29, delete "Document." and insert -- Document). --, therefor.

In the Specification

In Column 2, Line 40, delete "receive" and insert -- receiving --, therefor.

In Column 5, Line 19, delete "(IOT)" and insert -- (IoT) --, therefor.

In Column 6, Line 37, delete "step 1l" and insert -- step 1, --, therefor.

In Column 6, Line 63, delete "the selects" and insert -- selects --, therefor.

In Column 9, Line 22, delete "demand" and insert -- demand. --, therefor.

In Column 9, Line 50, delete "describe" and insert -- described --, therefor.

In Column 11, Line 15, delete "Ues," and insert -- UEs, --, therefor.

In Columns 17 & 18, in TABLE 6, under "Remarks", Line 9, delete "5.10.2.3.X-1." and insert -- 5.10.2.3.x-1. --, therefor.

In Columns 17 & 18, in TABLE 6, under "Remarks", Line 12, delete "5.10.2.3.X-1." and insert -- 5.10.2.3.x-1. --, therefor.

In Column 20, Line 51, delete "receive" and insert -- receiving --, therefor.

In Column 21, Line 41, delete "Blue-ray" and insert -- Blu-ray --, therefor.

Signed and Sealed this
Eighteenth Day of February, 2025

Coke Morgan Stewart
*Acting Director of the United States Patent and Trademark Office*